United States Patent [19]

Chow et al.

[11] Patent Number: 4,801,630

[45] Date of Patent: Jan. 31, 1989

[54] COMPOSITION FOR PREPARING CEMENT—ADHESIVE REINFORCING FIBERS

[75] Inventors: Wai Y. Chow; James J. McAlpin, both of Houston, Tex.

[73] Assignee: Exxon Chemical Patents Inc., Linden, N.J.

[21] Appl. No.: 46,205

[22] Filed: May 4, 1987

Related U.S. Application Data

[63] Continuation of Ser. No. 835,705, Mar. 3, 1986, abandoned.

[51] Int. Cl.$^4$ ........................... C08K 3/34; C08L 29/02
[52] U.S. Cl. ............................ 524/5; 525/57
[58] Field of Search ............................ 524/5

[56] References Cited

U.S. PATENT DOCUMENTS 3,197,428  7/1965  Siegele ........................... 524/5
3,932,692  1/1976  Hirata et al. ..................... 525/57
4,237,037  12/1980 Takahashi ........................ 525/57
4,293,473  10/1981 Eastman .......................... 525/57
4,362,844  12/1982 Lemstra et al. .................. 525/57
4,379,870  4/1983  Matsumoto ....................... 524/5
4,575,532  3/1986  Schmuckler et al. ............... 525/57
4,586,960  5/1986  Iizuka et al. ................... 524/5

Primary Examiner—Carman J. Seccuro
Attorney, Agent, or Firm—M. B. Kurtzman

[57] ABSTRACT

A modifier composition is disclosed for compounding with a polyolefin to produce a resin from which cement adherent polyolefin fibers may be produced by conventional fiber forming methods. The modifier composition comprises the reaction product of a vinyl alcohol copolymer with an acid modified polyolefin. Such modifier composition when compounded in from about 1 to about 10 weight percent with a polyolefin, preferably polypropylene, provides a resin from which cement adherent fibers may be produced.

3 Claims, 2 Drawing Sheets

COMPOSITION FOR PREPARING CEMENT—ADHESIVE REINFORCING FIBERS

FIELD OF THE INVENTION

This invention relates to a vinyl alcohol copolymer—polyolefin composition which renders polyolefins highly adherent for silicic surfaces. When compounded with a polyolefin the modifier composition of the invention provides a polyolefin resin from which cement adherent reinforcing fibers may be prepared which suitably substitute for asbestos fibers as a fibrous reinforcement for cement structures. Alternatively, the modifier composition may be applied as a coextruded surface coating to polyolefin fibers or as a surface layer to a polyolefin film from which fibers are prepared by. fibrillation. The invention also relates to the cement adherent polyolefin fibers so prepared and to cementitious articles prepared with such cement adherent polyolefin reinforcing fibers.

BACKGROUND OF THE INVENTION

Fibrous reinforcement is a well known method for improving the physical properties of cement and concrete structures. Asbestos fiber-reinforced cements have been widely employed as building materials. Asbestos-reinforced cements and concretes have long been used for the production of pipes, corrugated boards, roofing slates, machine foundations, storage tank walls, reactors, aircraft runways, roads, pilings and many. other high strength articles. The type of asbestos which is satisfactory. as fibrous reinforcement for cement is available in limited quantities. It is probable that the deposits of such workable asbestos will be exhausted relatively soon. Further, asbestos is now known to have carcinogenic effects. The carcinogenic properties of asbestos have lead to governmental regulations controlling and limiting its use.

Of the fibers currently used as an asbestos fiber replacement for cement reinforcement, polyacrylonitrile and polyvinyl alcohol fibers are preferred because they combine high fiber strength with good adhesion to a cement matrix. Unfortunately, both are expensive materials and significantly increase the cost of producing fiber reinforced cement structures.

A variety of other less-expensive materials have been considered for production of cement reinforcement fibers to replace asbestos fibers. Steel fibers have been tried and found inadequate because they suffer from chemical attack by the alkaline cement environment. Various polymeric fibers have also been found to be inadequate. Glass and polyester fibers degrade due to the alkaline environment of the cement matrix. Nylon and cellulose fibers have been found to be too water sensitive to be successfully used.

Ideally, polyolefin fibers could be employed as an asbestos replacement for reinforced cement. Polyolefin fibers possess good inherent properties, such as alkaline resistance, good stiffness and tensile strengths and are relatively inexpensive. Unfortunately, a major obstacle to the use of polyolefins as a cement reinforcing fiber material is their inherent lack of affinity towards an alkaline mineral matrix. Further, polyolefin fibers are less dense than a cement slurry and are not water wettable; that combination of properties makes it difficult to disperse the polyolefin fibers in the cement slurry during processing. Such poor dispersibility of polyolefin fibers results in poor reinforcement of a finished cementitious article.

Extensive efforts have been devoted to preparing polyolefin fibers, particularly polypropylene fibers, in a form which permits them to be successfully used as a replacement for asbestos fibers for reinforcement of cement and concrete structures.

Methods for fabricating polypropylene fibers in a way as to provide physical anchoring sites along the fibers for mechanical attachment of the cement matrix have been tried, as illustrated by U.S. Pat. Nos. 4,261,754; 4,414,030 and 4,477,522. European Patent Application No. 026 581 discloses that such fibers may be prepared by fibrillation of a polyolefin film which has been pretreated with a coupling agent such as an acid anhydride or methacryloxypropyltrimethoxysilane. Other methods involve the addition of certain thickening and clay additives to the cement slurry to hold the polypropylene reinforcing fibers in dispersion until the slurry sets, as illustrated by U.S. Pat. Nos. 4,363,666 and 4,428,775. Still another method to improve flocculation of polypropylene fibers when mixing with cement is to treat the cement-fiber mix with a watersoluble or emulsifiable polymer and a polyvalent salt such as $Al_2(SO_4)_3$, as illustrated by U.S. Pat. No. 4,339,273.

Other procedures designed to render polypropylene fibers $uitable as a cement reinforcing material involve the physical modification of the fiber surface by various means. To produce cement adherent fibers U.K. Patent Application No. 2,030,891 teaches a method for embedding inorganic powders in the surface of fibrillated polypropylene. Japanese Patent Publication No. 60 060 960 applies a fine aggregate to the fiber surface by means of a radiation hardenable epoxy binder to produce a cement adherent polypropylene reinforcing fiber.

Still other methods chemically treat the surface of polyolefin fibers to render the fiber surface more adherent to cement. Such methods include treatment of the polyolefin fibers with an aqueous dispersion of colloidal alumina or silica in conjunction with a chlorinated polypropylene, as taught by Japanese Patent Publication No. 7319849; a non-ionic or cationic polymer agglutinating agent such as a polyethylene oxide or poly(alkylaminoacrylate) as shown by Japanese Patent Publication No. 60 081 052; or a solution of an alkali or alkaline earth metal (bi) carbonate as disclosed in Belgium Patent No. 899,810.

Yet others have suggested chemical modifications of the base polyolefin from which the fibers are produced. Hence, U.K. Patent Application No. 2,021,552A states that an inorganic or organic acid group should be incorporated in the base polyolefin, either by copolymerization of acid monomers or by grafting acid groups to a prepared polyolefin, in order to improve the adherence to cement of fibers made of modified polyolefin. Polypropylene grafted with maleic anhydride is illustrated as an example of an improved material for producing cement reinforcing fibers. Japanese Patent Publication No. 49 036 748 also illustrates the use of maleated polypropylene as a material for producing cement reinforcing fibers. Another approach, as discussed in German Offenlegungsschrift DE 3341 462 A1, treats the polyolefin under elevated temperature and pressure with a solution of silane or $SiCl_4$ together with silicic acid or a metal silicate and thereafter precipitates the reaction product as fibrils by lowering the temperature. The fibrils so produced are useful as asbestos fibers substitutes for reinforced cement structures.

Others have suggested that the surface of polyolefin fibers be catalytically reacted with reactive organic or inorganic Si (IV) compounds to render them adhesive to cement. Among the silanes disclosed as suitable for a method of this type are silicic acid anhydrides, organic halosilanes, and silicate esters as discussed in European Patent Application No. 0 051 256 and German Offenlegungsschrift DE No. 32 10693 A1.

To date, polyolefin fibers have been made compatible as reinforcement fiber for cement only by incorporating additional compatibilizing agents into the cement slurry into which the fibers are admixed, by the special fabrication of the fibers to provide physical anchoring sites therein for mechanically anchoring to the cement matrix, by the chemical modification of the base polyolefin from which the fibers are then produced, or by the chemical modification of the fiber surfaces by costly and time consuming chemical reactions.

Ideally an agent could be found which when admixed in small quantities with a polyolefin stock material would allow the direct production of cement adherent fibers therefrom by conventional fiber production techniques. In our copending application Ser. No. 816,032, filed Jan. 3, 1986, a composition useful for compounding with olefinic polymers which can provide cement adherent fibers is disclosed and claimed.

SUMMARY OF THE INVENTION

It has now been discovered that a modifier composition comprising the reaction product of a vinyl alcohol copolymer with an acid modified polyolefin can oe compounded with an olefinic polymer to provide a polyolefin resin from which cement-adherent fibers may be directly produced by conventional fiber fabricating techniques. A preferred modifier composition is the melt reaction product of a vinyl alcohol copolymer with 28 wt % ethylene with a maleated polypropylene.

The modifier composition may. be dry blended in small amounts with an olefin homopolymer or copolymer to provide a polyolefin resin stock from which cement adherent fibers may be directly produced by conventional fiber extruding, spinning or fibrillation techniques. Alternatively, the modifier composition or a dilution thereof may be coextruded as a surface layer upon an olefin polymer film and cement adherent fibers may be produced from said film by fibrillation techniques.

Fibers produced from a polyolefin resin which incorporates a modifier composition of the invention are adherent to cements and concretes and may be used as a substitute for asbestos fibers for the fibrous reinforcement of cement and concrete articles. Polyolefin reinforcing fibers produced in accordance with the invention impart superior physical properties, particularly extensibility and toughness, to finished reinforced cement articles as compared to articles reinforced with fibers produced only from an acid modified polyolefin. In addition, the wettability of the fibers of this invention is enhanced, thus improving their dispersibility in the cement slurry during processing.

DETAILED DESCRIPTION OF THE PREFERRED EMBODIMENT

Figure 1:
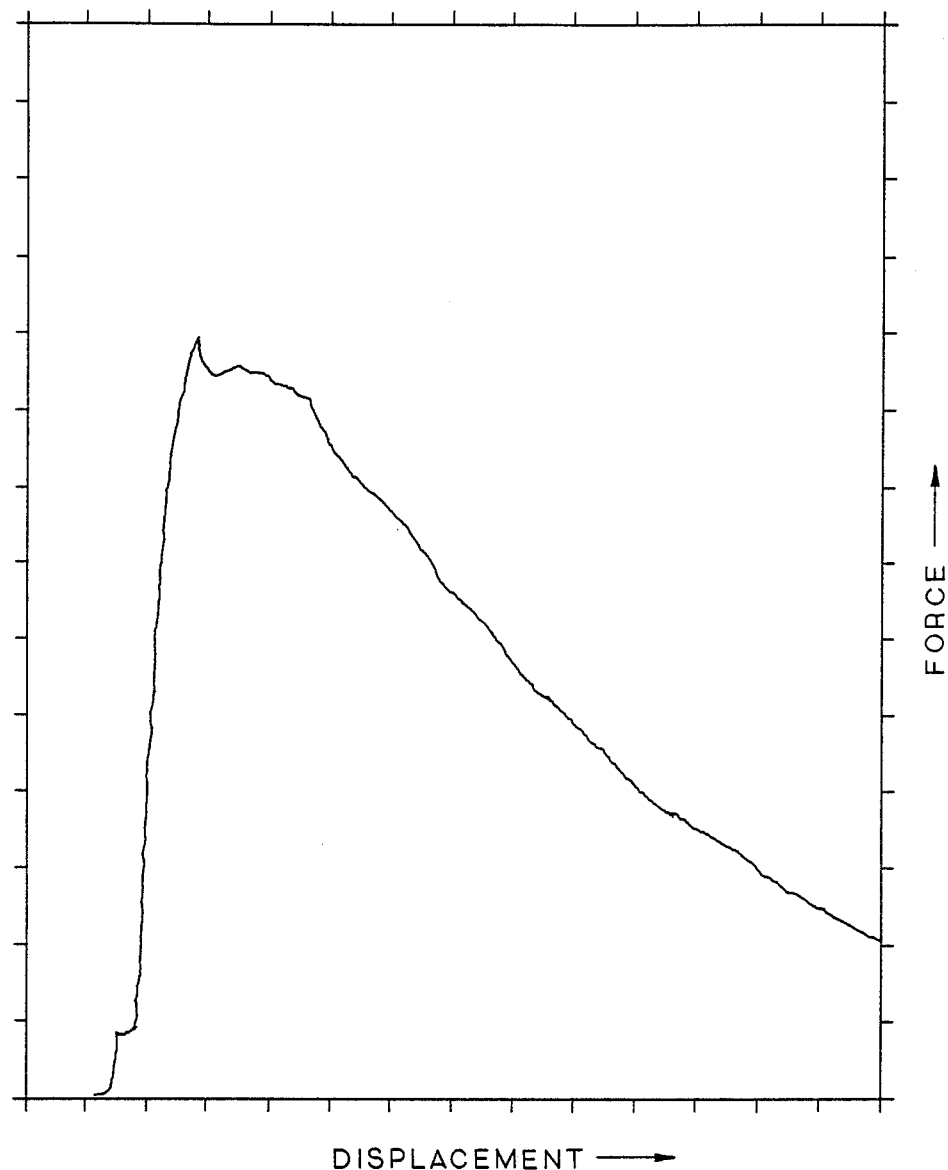
FIG. 1 is the force-displacement curve obtained upon a bending test in a horizontal configuration of a concrete test bar reinforced with 4 volume percent polypropylene fibers containing a modifier composition in accordance with the invention.

Any polyolefin may be rendered suitable for production of cement adherent fibers by the addition thereto of a modifying agent of the invention. Examples of suitable polyolefins are polyethylene, polypropylene, polybutene, olefinic copolymers, such as ethylene-butene or propylene-ethylene copolymers, olefinic terpolymers, such as propylene-ethylene-butene terpolymers, or mixtures and blends of the above olefinic polymers. In view of its good intrinsic physical and chemical properties polypropylene and its copolymers, such as its random copolymers with minor amounts of ethylene, is a preferred material for the production of concrete adhesive reinforcing fibers.

The modifying agent which is compounded with a polyolefin to render it adhesive to cement comprises a reaction product of an ethylene vinyl alcohol copolymer with an acid modified olefinic polymer, copolymer or terpolymer. Preferably the reaction is carried out in the melt phase.

A vinyl alcohol copolymer is defined herein to mean a polymer with the following structure:

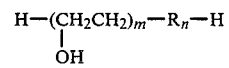

wherein R is any comonomer polymerizable via a free radical route which lowers the melting point of the copolymer sufficiently to allow its melt processing. Examples of such comonomers are ethylene, styrene and vinyl acetate. The 'm' and 'n' refer to the numbers of each monomer unit in the chain. In the preferred composition of this invention 'm' is about 400 and 'n' is about 300. Preparation of the ethylene copolymers is described in U.S. Pat. No. 3,925,336, assigned to Nippon Gohsei Co. of Japan.

The distribution of the comonomers along the chain can range from random to blocked, provided only that the resulting copolymer retains its melt processability. Compositions which are effective in the present application range from about 25 mol % vinyl alcohol to about 90 mol % vinyl alcohol with the range 45-85 mol % being preferred.

An acid modified polyolefin as defined herein means an olefinic homopolymer, copolymer or terpolymer which contains from about 0.1 wt % to about 4.0 wt % acid functional groups as free carboxylic acid or as carboxylic acid anhydride.

A polyolefin resin for production of cement adherent fibers may readily be prepared by blending the modifier composition with an olefinic polymer. The modifier is intimately and homogeneously admixed with the base polyolefin compound to form a resin from which fibers are subsequently produced. Fibers produced from such modified polyolefin resin exhibit a rougher surface texture than fibers produced from a polyolefin not containing the modifier agent. This is believed to be due to the migration of the modifier agent from the polymer matrix of the fiber core to the surface of the fiber during fiber forming or film production from the resin. This migration or blooming phenomena is believed to account for the fact that a smal amount of the modifier agent may be incorporated into a polyolefin resin yet significantly increased adhesion of fibers produced therefrom towards cement is still achieved.

The acid modified polyolefins which may. be employed to produce the modifier agents of the invention are those acid modified poly alpha-olefins or mixtures thereof; such as acid modified polyethylene, polypropylene, polybutene-1, and olefinic copolymers. The acid modified polyolefins are known materials and may be prepared by known procedures, as disclosed for example in U.S. Pat. No. 2,973,344. The unsaturated alpha-beta carboxylic acids and acid anhydrides useful for forming the acid modified polyolefins are exemplified by acrylic acid, maleic acid, fumaric acid, itaconic acid, citraconic acid, methacrylic acid, crotonic acid, isocrotonic acid, maleic anhydride, itaconic anhydride, citraconic anhydride, and himic anhydride. Preferably, to insure that the modifier agent produced from such acid modified polyolefins will readily migrate or bloom to the surface of a polyolefin fiber, the polyolefin portion of the acid modified polyolefin used to produce the modifier desirably has a number average molecular weight of from about 2,500 to about 50,000. If the number average molecular weight of the polyolefin portion of the acid modified polyolefin exceeds about 50,000 there is a reduction in effectiveness. Of course, acid modified polyolefins having a number average molecular weight in excess of 50,000 may be used to prepare modifiers of the invention, but in such case it is desirable to incorporate such higher number average molecular weight modifier composition into the base polyolefin as a coextruded layer upon a polyolefin film from which fibers are subsequently produced by fibrillation.

Alternatively, if the acid modified polyolefin is a polyethylene it may be produced by the copolymerization of ethylene monomer with from about 0.1 to about 4 weight percent of an acid olefin comonomer. Examples of copolymer suitable as the acid modified polyolefin include copolymer of ethylene with acrylic acid, methacrylic acid, itaconic acid, malonoic acid and methylmethacrylic acid.

The acid content of the acid modified polyolefin may range from about 0.1 to about 4.0 weight percent. As noted, the number average molecular weight of the polyolefin component is generally in the range of from about 2,500 to about 50,000. The content of the acid component should preferably be selected to provide on the average from 0.1 to 2.0 pendant acid groups per polymer chain. Although an acid modified polyolefin may be used which has an acid content which exceeds on the average two pendant acid groups per polymer chain, generally no significant additional benefit is observed from the excess amount of acid component. The preferred acid modified polyolefin is a maleic anhydride modified polypropylene, such as a 25,000 number average molecular weight polypropylene with a succinic anhydride content of about 0.25 wt %.

The modifier composition is prepared by dry blending a suitable acid modified polyolefin, preferably in powder form, with the vinyl alcohol copolymer in amounts calculated to yield from about 0.1 to about 2, and preferably from about 0.2 to about 1 acid modified polypropylene chains per vinyl alcohol copolymer chain. Wherein the acid modified polyolefin is a maleated polypropylene containing about 0.25 wt % maleic anhydride, it is preferably blended with an ethylene vinyl alcohol copolymer of about 28 wt % ethylene and with degree of polymerization about 700 in a weight ratio of about 2:5. The resulting blend can be extruded directly or mixed with additional polypropylene and extruded under normal conditions such as at a temperature of about 425° F. and a residence time about 1-3 minutes during which operation the reaction of the maleated PP and the EVOH alcohol copolymer is essentially complete. An amount of unmodified polypropylene may be added to the blend prior to extrusion to enhance extrudability, if required.

A polyolefin resin for production of cement adherent fibers is prepared by mixing from about 2 to about 50 melt index polyolefin, such as polypropylene, with from about 1 to about 10 wt % of the modifier composition. Preferably the polypropylene has a melt index (measured at 230° C.) of from about 2 to about 10. Generally, modifier contents of from about 2 to about 6 wt % provide the resulting polyolefin resin with more than adequate adhesion toward cement as well as improved wettability. The modifier may be compounded with the polyolefin in a single-screw or twin-screw extruder of co-rotating or counter-rotating design, extruded to strands and pelletized by a hot die face cutting or a cold cutting system. At this point, it may also be desirable to add a filler such as calcium carbonate to adjust the density of the resin to improve its dispersibility in the cement slurry.

The pelletized modified resin may be used as the feed stock for fiber production by any of the conventional fiber forming methods. Filaments of the so modified polyolefin resin may be prepared by melt-spinning techniques or by film slitting.

The cement adherent reinforcing fibers formed from the modified polyolefin resin should be prepared as a 1 to 100 denier fiber, preferably from about 2 to about 80 denier, with the preferred fiber size being dictated by the details of the cementitious matrix. The fibers may be prepared in any length, but lengths of from about ⅛ to 3 inches are preferred, and most preferred are fiber lengths of from about ⅛ to 1 inch.

Cement adherent polyolefin reinforcing fibers prepared in accordance with the invention are suitable for reinforcement of all common cement compositions, such as Portland cements, marble cement, puzzolanic cement, trass cement, blast furnace cement, gypsum cements, calcium silicates and others. In addition to the reinforcing polyolefin fibers of the invention, the cement composition may contain further additives and fillers such as fly ash, limestone, quartz, pearlite, rock wool, cellulose, diatomaceous earth, flue dust, pozzolana or mixtures thereof.

Reinforced cement articles are prepared by mixing polyolefin reinforcing fibers of the invention with the cement slurry in fiber amounts of from about 0.5 to about 20 percent by volume (dry basis), preferably from about 1 to about 10 percent by. volume, and most preferably in fiber amounts from about 2 to about 8 percent by volume. In order to obtain more uniform dispersion of the reinforcing fibers, one can employ. known inert, dense fillers such as $CaCo_3$, talc and the like in the resin formulation.

EXAMPLE

A modifier composition was prepared by dry blending 16 parts by weight of an ethylene vinyl alcohol copolymer with about 28 wt % ethylene and a number average molecular weight of about 25,000 and 7 parts by weight of maleated polyprop.ylene containing about 0.25 wt % succinic anhydride and having a melt flow rate of about 500 with 77 parts by weight of a 3 melt flow rate polypropylene and pelletizing the resulting blend in a small single screw extruder. This pelletized composition was then blended in a ratio of 1 to 4 with the same base polypropylene and the final blend was then extruded.

The resulting pelletized modified polypropylene resin was then extruded into film; the film was oriented, fibrillated and chopped into staple fiber of about 20 denier and 6 mm length. This staple was randomly dispersed in a concrete made by mixing Portland cement type P-40, fine sand type 0000 and water (according to Norm NBN B.12-208; consistency 1.5 as described in Norm NBN B 14-207). The fiber was present in the final formulation to the extent of 4 vol %. Test bars of 15.5 cm length, 2 cm width and 1 cm height were molded from the concrete. The bars were cured in water and then in a wet chamber (as per Norm NBN B-12-208).

A comparison sample was prepared by producing staple fibers in a manner identical to that described above from a compound of a 3 melt flow rate polypropylene and a maleic anhydride modified polypropylene with an acid number of 43. The compound contained 1.65 wt % of the acid modified polypropylene. The addition of acid modified polypropylene to fiber compositions of the type used here has been found to improve their adhesion to cement. Thus, this comparison standard is more stringent than an unmodified polypropylene case.

Figure 2:
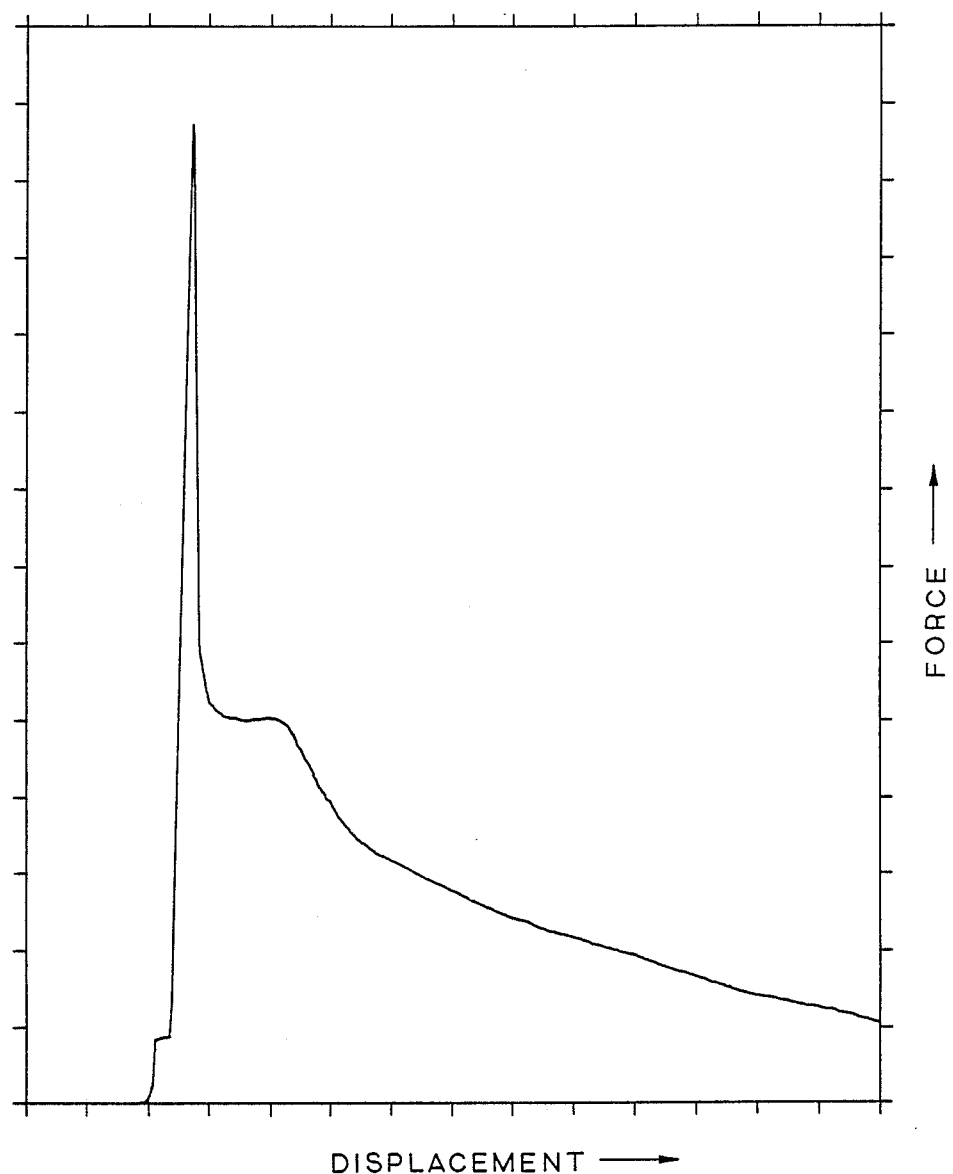
FIG. 2 is the force-displacement curve obtained upon a bending test in a horizontal configuration of a concrete test bar reinforced with 4 volume percent polypropylene fibers containing 1.65 wt % maleated polypropylene.

The cured bars were then subjected to a bending test in a horizontal configuration with a support near each end of the bar and the load applied from the top in the center of the bar. The force-displacement results are displayed in FIGS. 1 and 2. FIG. 1 gives the results for the bars reinforced with the modified polypropylene fibers of the present invention. FIG. 2 represents the results for the comparison sample using a polypropylene fiber containing 1.65 wt % maleated polypropylene.

In a test of this type, the area under the force-displacement curve correlates directly with toughness and extensibility in actual application. Comparing FIGS. 1 and 2, an increase of at least 100% is seen in this critical area measurement in going from the acid modified fiber specimen to the material based on the fibers of the present invention.

The invention has been described and disclosed with reference to various of its particular and preferred embodiments. Upon reading and understanding this disclosure a person of ordinary skill in the art may appreciate that various modifications and changes may be made in the practice of the invention compared to the particular and preferred embodiments as described herein wnich do not depart from the scope and spirit of the invention as described above or claimed hereafter.

What is claimed is:

1. A fiber reinforced cement article comprising: cement having in intimate admixture therein from about 1 to about 10 percent by volume fibers composed of a polyolefin resin composition comprising:
   (1) from about 90 wt % to about 99 wt % of an olefin polymer; and
   (2) from about 1 wt % to about 10 wt % of a modifying agent in intimate admixture with said olefin polymer, said modifying agent comprising the reaction product of a vinyl alcohol copolymer with an acid modified polyolefin in an amount of from about 0.1 to 2.0 acid modified polyolefin chains per vinyl alcohol copolymer chain.

2. The article of claim 1 wherein the olefin polymer is polypropylene and the acid modified polyolefin is maleated polypropylene.

3. The article of claim 2 wherein the vinyl alcohol copolymer is a vinyl alconol ethylene copolymer comprising about 28 wt % ethylene units and with a number average molecular weight of about 25,000.

* * * * *